US012531180B2

(12) United States Patent
Yang et al.

(10) Patent No.: US 12,531,180 B2
(45) Date of Patent: Jan. 20, 2026

(54) MAGNETIC ASSEMBLY AND POWER MODULE

(71) Applicant: Delta Electronics (Shanghai) Co., Ltd., Shanghai (CN)

(72) Inventors: Haijun Yang, Shanghai (CN); Tianding Hong, Shanghai (CN); Warda Gul, Shanghai (CN); Zengyi Lu, Shanghai (CN); Minli Jia, Shanghai (CN); Jinfa Zhang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 972 days.

(21) Appl. No.: 17/577,341

(22) Filed: Jan. 17, 2022

(65) Prior Publication Data

US 2022/0406515 A1 Dec. 22, 2022

(30) Foreign Application Priority Data

Jun. 18, 2021 (CN) ......................... 202110677995.5

(51) Int. Cl.

| | |
|---|---|
| ***H01F 27/28*** | (2006.01) |
| ***H01F 27/26*** | (2006.01) |
| ***H01F 38/14*** | (2006.01) |
| ***H02M 3/33*** | (2006.01) |
| ***H02M 3/335*** | (2006.01) |

(52) U.S. Cl.

CPC ....... *H01F 27/2847* (2013.01); *H01F 27/263* (2013.01); *H01F 38/14* (2013.01); *H02M 3/33576* (2013.01)

(58) Field of Classification Search

CPC .... H01F 27/2847; H01F 27/263; H01F 38/14; H02M 3/33576

See application file for complete search history.

(56) References Cited

U.S. PATENT DOCUMENTS

| | | | | |
|---|---|---|---|---|
| 11,342,105 | B2 * | 5/2022 | Inaba | H01F 27/022 |
| 2015/0155089 | A1 * | 6/2015 | Lu | H01F 27/40 336/185 |
| 2017/0214330 | A1 * | 7/2017 | Yang | H01F 37/00 |

FOREIGN PATENT DOCUMENTS

| | | | |
|---|---|---|---|
| CN | 201075328 | Y | 6/2008 |
| CN | 103474214 | A | 12/2013 |
| CN | 104701000 | A | 6/2015 |
| CN | 205104331 | U | 3/2016 |

(Continued)

*Primary Examiner* — Malcolm Barnes

(74) *Attorney, Agent, or Firm* — KIRTON McCONKIE; Evan R. Witt

(57) ABSTRACT

The present disclose provides a magnetic assembly and a power module. In one aspect, the magnetic assembly includes a magnetic core having a first magnetic leg and a second magnetic leg spatially separated from the first magnetic leg to define a spatial channel therebetween, and a winding assembly comprising a first winding, a second winding, and a third winding. The first and second windings are wound around the first magnetic leg with at least a part of the first and second windings being accommodated within the spatial channel. The third winding is wound around the first and second magnetic legs. The first winding is disposed between the first magnetic leg and the second winding. The second winding is disposed between the first winding and the third winding.

29 Claims, 18 Drawing Sheets

(56) References Cited

FOREIGN PATENT DOCUMENTS

| | | | | | |
|---|---|---|---|---|---|
| CN | 107077951 | A | | 8/2017 | |
| CN | 108109821 | A | | 6/2018 | |
| CN | 108777219 | A | * | 11/2018 | ............. H01F 27/24 |
| CN | 109378180 | A | * | 2/2019 | ............. H01F 38/00 |
| CN | 208690074 | U | | 4/2019 | |
| CN | 110571022 | A | | 12/2019 | |
| CN | 110729903 | A | | 1/2020 | |
| CN | 210516433 | U | | 5/2020 | |
| CN | 210970721 | U | | 7/2020 | |
| CN | 213150542 | U | | 5/2021 | |
| DE | 102019219662 | A1 | * | 6/2021 | ............. H01F 38/08 |
| EP | 3648128 | A2 | * | 5/2020 | ........... H01F 27/303 |
| JP | 2011082205 | A | * | 4/2011 | |
| WO | WO-2019109572 | A1 | * | 6/2019 | ............. H01F 38/00 |

* cited by examiner

1''

MAGNETIC ASSEMBLY AND POWER MODULE

RELATED APPLICATION

This application claims priority to China Patent Application No. 202110677995.5, filed on Jun. 18, 2021. The entire contents of the above-mentioned patent application are incorporated herein by reference for all purposes.

TECHNICAL FIELD

The present disclosure relates to a magnetic assembly and a power module. More particularly, the present disclosure relates to a magnetic assembly and a power module with a small spatial volume, light weightiness, and low cost.

BACKGROUND

With the continuous development of new energy electric vehicle technologies, the on-board charger (OBC) of an electric vehicle is developed to have a higher power density and lower cost. The magnetic element in a power module (or power converter) is an important component of the on-board charger. The performance and the cost of the magnetic element are the key factors influencing the development of the on-board charger.

Presently, on-board chargers are conventionally divided into two types, i.e., a unidirectional power flow on-board charger and a bidirectional power flow on-board charger. To increase the functions of the on-board charger, a first hybrid power module and a second hybrid power module are developed. The first hybrid power module is a combination of the unidirectional power flow on-board charger and an auxiliary power module (APM). The second hybrid power module is a combination of the bidirectional power flow on-board charger and the auxiliary power module. Generally, the on-board charger (OBC) and the auxiliary power module (APM) have independent circuitry topologies, and the two circuitry topologies are packaged in a case through a mechanical assembling process. Although the functions of the on-board charger (OBC) and the auxiliary power module (APM) are combined together, the circuitry topologies are not integrated. Consequently, both of the power module and the magnetic element suffer from high spatial volume, heavy weightiness, and high cost.

FIG. 1A is a schematic circuit diagram illustrating the circuitry topology of a power module 1' of a conventional on-board charger. FIG. 1B is a schematic circuit diagram illustrating the circuitry topology of a conventional auxiliary power module 1". As shown in FIG. 1A, the circuitry topology of power module 1' of the conventional on-board charger includes an LLC resonant circuit or a boost series resonant circuit (Boost SRC). The magnetic element of the conventional on-board charger includes resonant inductors Lr1, Lr2, and a transformer Tx. Alternatively, in some embodiments, the magnetic element of power module 1' of the conventional on-board charger includes resonant inductor Lr1 and transformer Tx only.

As shown in FIG. 1B, the circuitry topology of the conventional auxiliary power module 1" includes a hard switch circuit, wherein the secondary winding of the hard switch circuit has a center-tap structure. The primary circuit of the conventional auxiliary power module 1" includes a half-bridge circuit, a full-bridge circuit, or a push-pull circuit. The conventional auxiliary power module 1" includes an output filter inductor Lo and a transformer Tx.

As mentioned above, the hybrid power module with the combination of the on-board charger and the auxiliary power module at least requires four or five magnetic elements. Consequently, the hybrid power module suffers from large spatial volume, heavy weightiness, and high cost.

SUMMARY

An object of the present disclosure is to provide an integrated magnetic assembly and a three-port power module (or power converter) including the integrated magnetic assembly. The three-port power module has composite functions by integrating an LLC resonant circuit with an auxiliary power module (i.e., LLC & APM) or integrating a boost series resonant circuit with an auxiliary power module (i.e., Boost SRC& APM). Consequently, the magnetic assembly and the power module has smaller spatial volume, lighter weightiness, and lower cost.

In accordance with an aspect of the present disclosure, the magnetic assembly includes at least one magnetic core and at least one winding assembly. Each magnetic core includes a first magnetic leg and a second magnetic leg. The second magnetic leg has a first side, a second side, a third side, and a fourth side. The first side and the second side are opposed to each other. The third side and the fourth side are opposed to each other. A channel is formed between the first magnetic leg and the second side of the second magnetic leg. Each winding assembly includes a first winding, a second winding and a third winding. The first winding and the second winding are wound around the first magnetic leg. A part of the first winding and a part of the second winding are accommodated within the channel. The first winding is disposed between the first magnetic leg and the second winding. The third winding is wound around the second magnetic leg and the first magnetic leg. The second winding is disposed between the first winding and the third winding.

In accordance with another aspect of the present disclosure, a power module is provided. The power module includes a first port, a second port, a third port, a primary circuit, a transformer, a first secondary circuit, and a second secondary circuit. The primary circuit is electrically coupled with the first port. The transformer includes a primary winding, a first secondary winding, and a second secondary winding. The primary winding is electrically coupled with the primary circuit. The first secondary circuit is electrically coupled with the first secondary winding and the second port. The second secondary circuit is electrically coupled with the second secondary winding and the third port. The second secondary circuit includes a secondary inductor electrically coupled to the second secondary winding. The transformer and the secondary inductor of the second secondary circuit are integrated into the above-mentioned magnetic assembly.

The present disclosure has the following benefits. In the magnetic assembly of the present disclosure, the first winding and the second winding are wound around the first magnetic leg, and the third winding is wound around the first magnetic leg and the second magnetic leg. Due to the arrangement of the magnetic core and the winding assembly, the transformer and the second secondary inductor are integrated into the magnetic assembly. The magnetic assembly and the first secondary inductor of the power module can achieve the integration function of the OBC circuit and the APM circuit.

BRIEF DESCRIPTION OF THE DRAWINGS

Embodiments of the present disclosure will become more readily apparent to those ordinarily skilled in the art upon review of the following detailed description along with the accompanying drawings, in which.

DETAILED DESCRIPTION

Embodiments of the present disclosure will now be described in more detail as follows. It is to be noted that the following descriptions of embodiments of the present disclosure are presented herein for purpose of illustration and description only. It is not intended to be exhaustive or to be limited to the precise form disclosed.

Figure 1A:
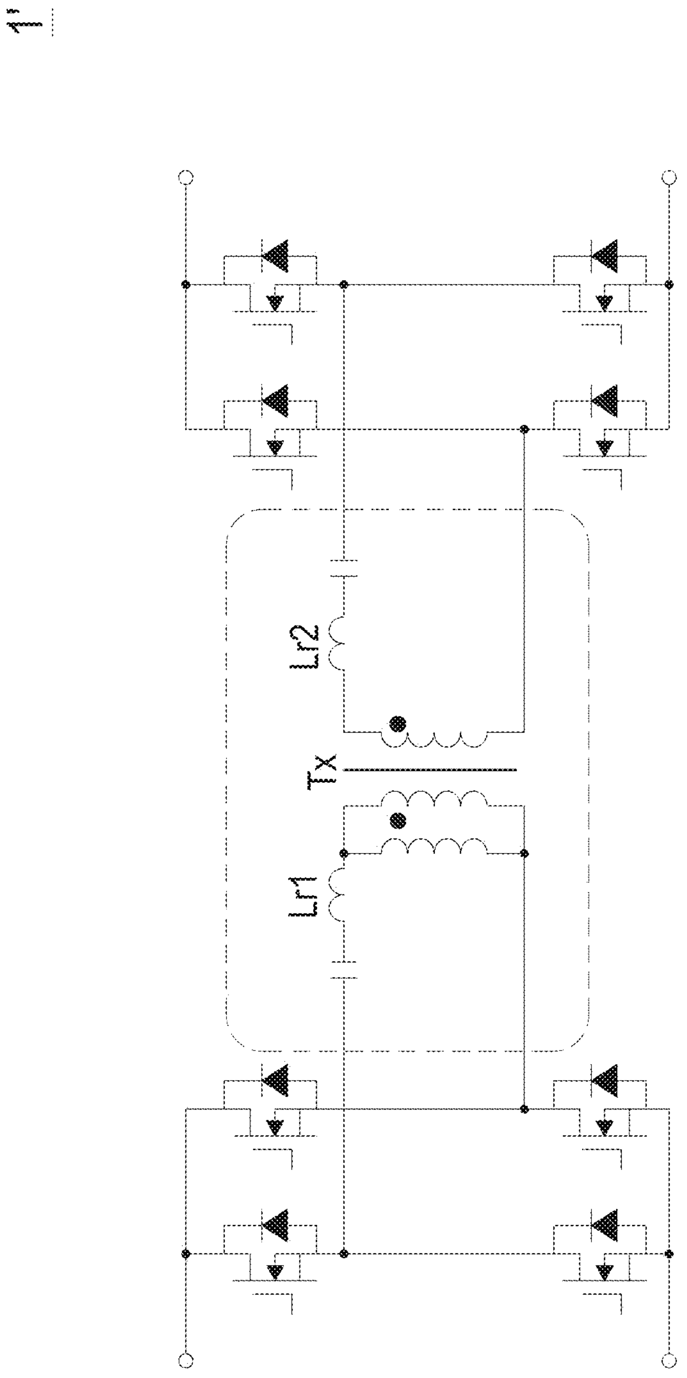
FIG. 1A PRIOR ART
FIG. 1A is a schematic circuit diagram illustrating the circuitry topology of a power module of a conventional on-board charger.
Figure 1B:
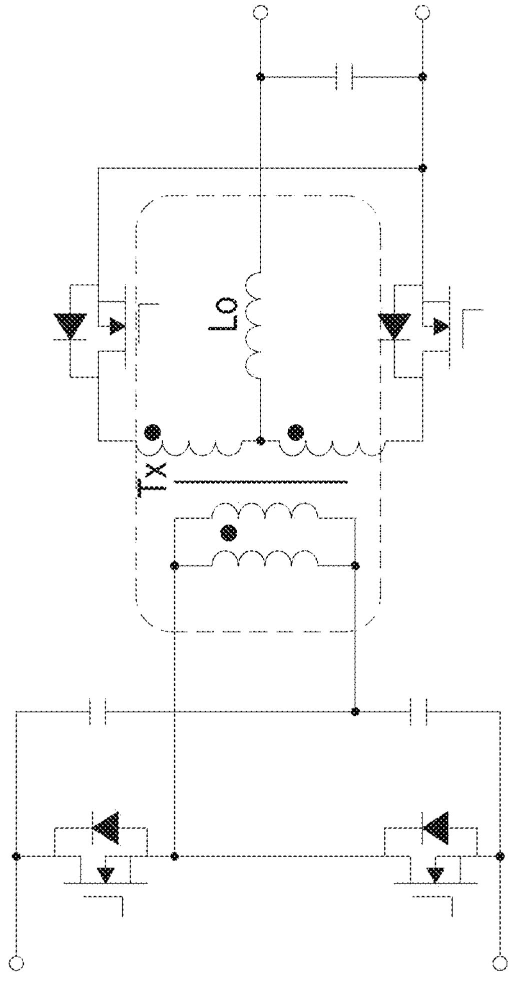
FIG. 1B PRIOR ART
FIG. 1B is a schematic circuit diagram illustrating the circuitry topology of a conventional auxiliary power module.
Figure 2:
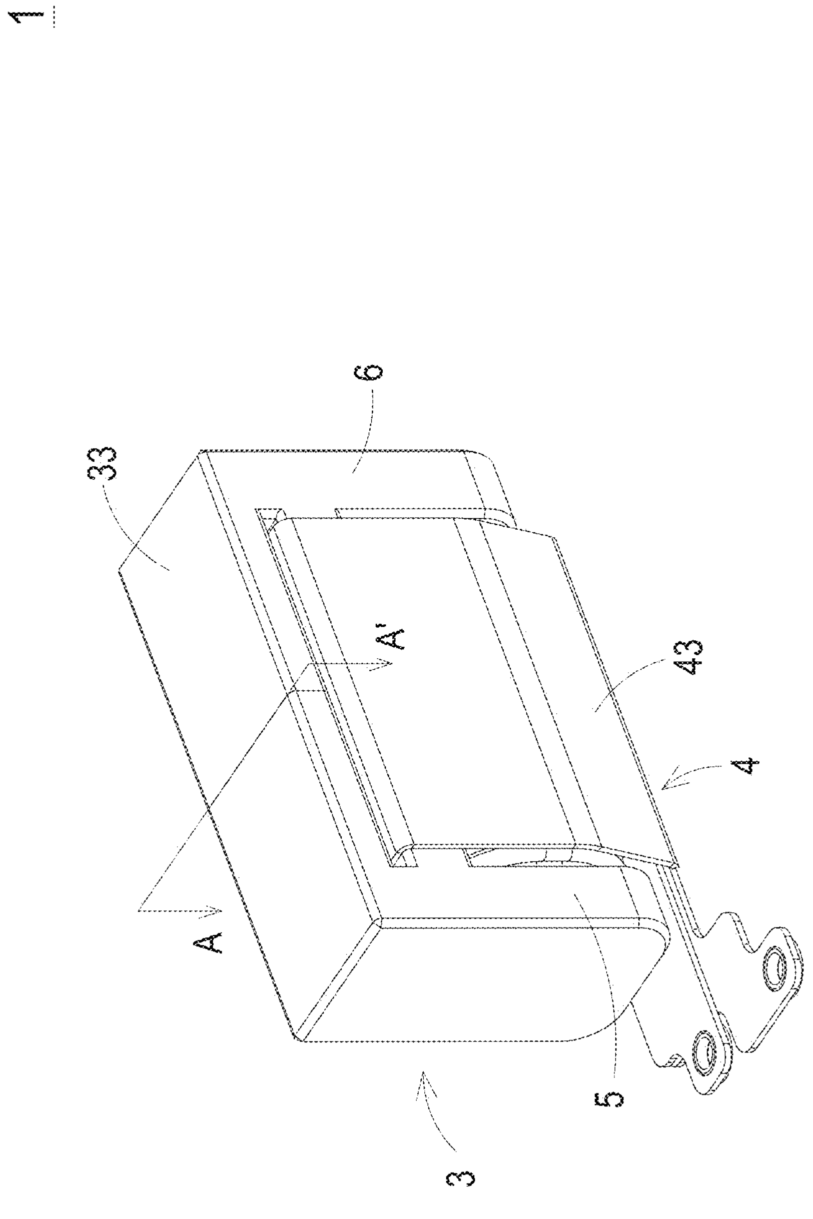
FIG. 2 is a perspective view schematically illustrating a magnetic assembly according to a first embodiment of the present disclosure.
Figure 3:
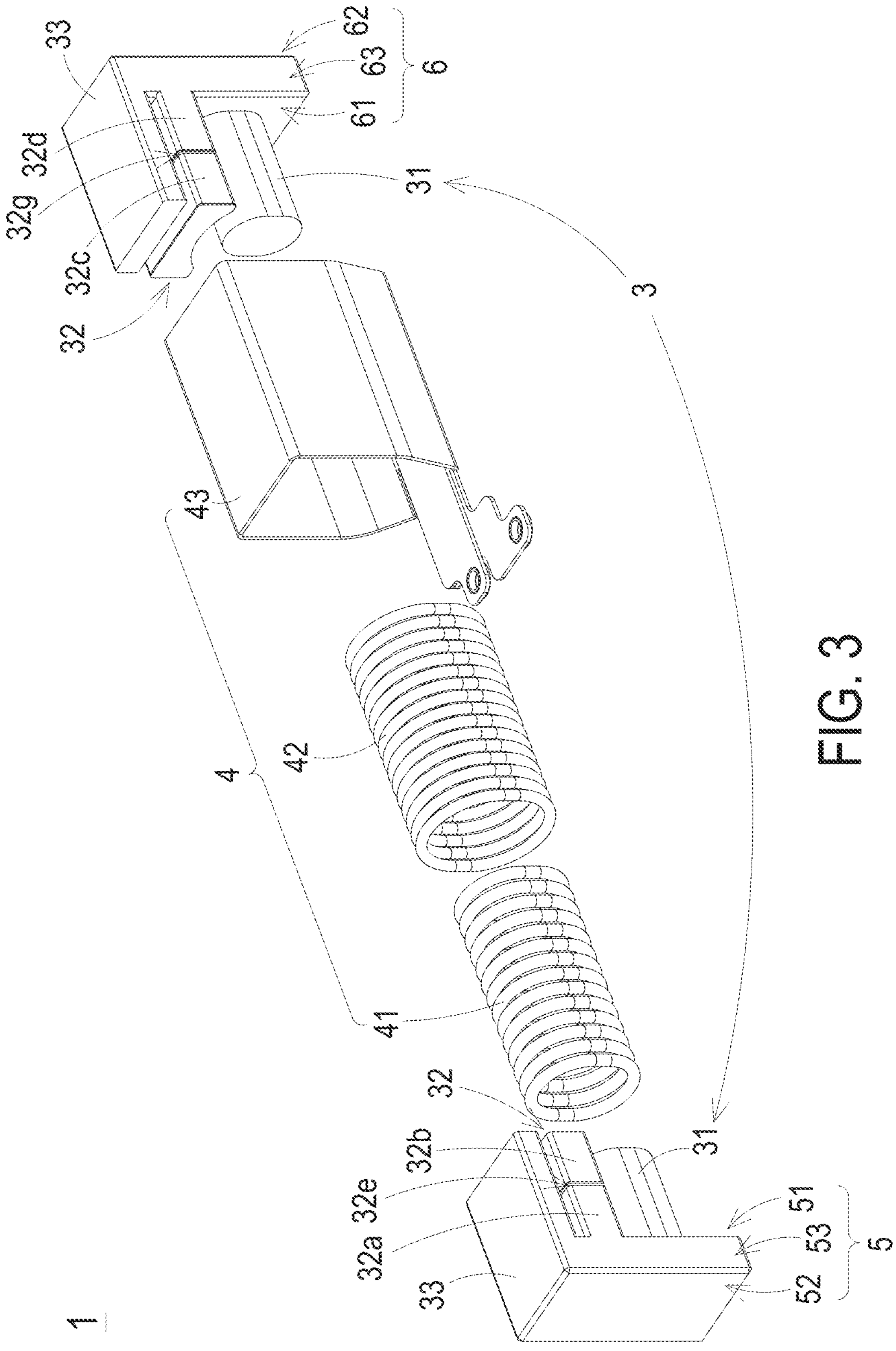
FIG. 3 is an exploded view schematically illustrating the magnetic assembly as shown in FIG. 2.
Figure 4:
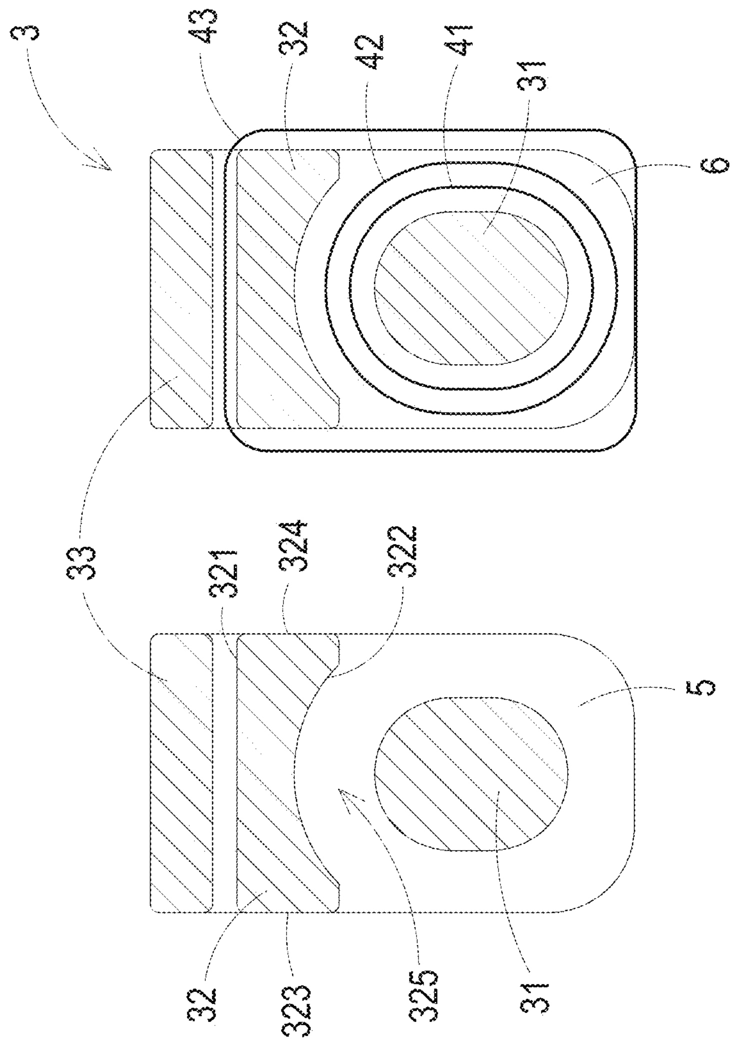
FIG. 4 is a cross-sectional view schematically illustrating the magnetic assembly as shown in FIG. 2 and taken along line A-A'.
Figure 5:
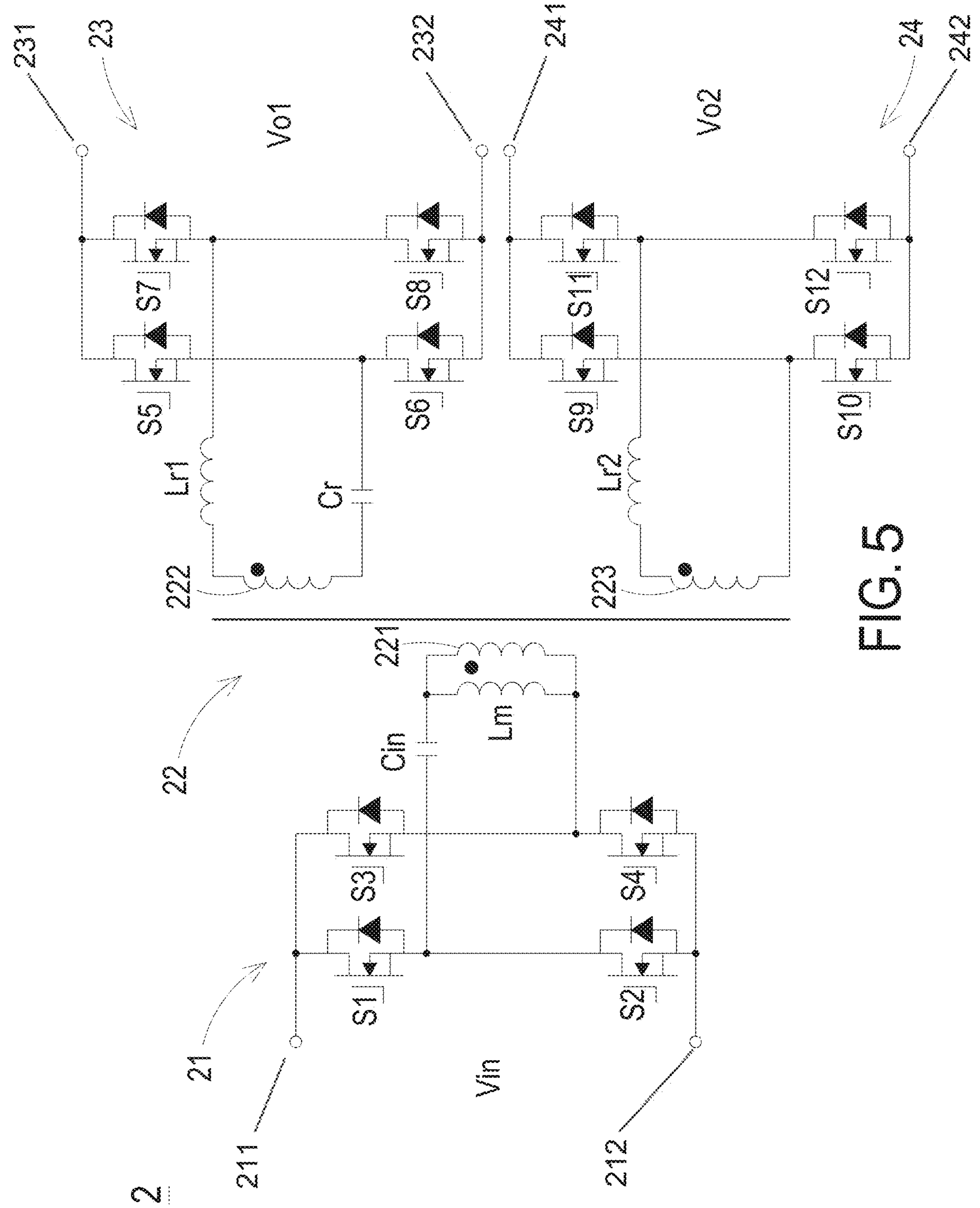
FIG. 5 is a schematic circuit diagram illustrating a circuitry topology of a power module with the magnetic assembly as shown in FIG. 2.

FIG. 2 is a perspective view schematically illustrating a magnetic assembly 1 according to a first embodiment of the present disclosure. FIG. 3 is an exploded view schematically illustrating magnetic assembly 1 as shown in FIG. 2. FIG. 4 is a cross-sectional view schematically illustrating magnetic assembly 1 as shown in FIG. 2 and taken along line A-A'. FIG. 5 is a schematic circuit diagram illustrating a circuitry topology of a power module 2 including magnetic assembly 1 as shown in FIG. 2. Magnetic assembly 1 can be used in power module 2 as shown in FIG. 5, while power module 2 can be used in an on-board charger.

As shown in FIG. 5, power module 2 includes a three-port power converter, which includes a primary circuit 21, a transformer 22, a first secondary circuit 23, and a second secondary circuit 24.

First terminals 211 and 212 of primary circuit 21 are electrically coupled with an output port of a front-end circuit. That is, first terminals 211 and 212 of primary circuit 21 is electrically coupled with a supply voltage Vin. The input port of the front-end circuit can be directly connected with a power grid (not shown) or indirectly connected with the power grid through an additional filtering circuit. In one embodiment, primary circuit 21 includes a full-bridge inverter circuit, and further includes a primary inductor Lm, a primary capacitor Cin, and a plurality of switches S1, S2, S3, S4. It is noted that numerous modifications and alterations may be made while maintaining the teachings of the present disclosure. For example, in another embodiment, primary circuit 21 can be a half-bridge circuit. In some embodiments, primary inductor Lm can be integrated with the transformer.

Transformer 22 includes a primary winding 221, a first secondary winding 222, and a second secondary winding 223. Primary winding 221 of transformer 22 is electrically coupled with primary circuit 21. Primary winding 221 of transformer 22 receives supply voltage Vin. For example, supply voltage Vin can be 400V, 800V, or any other appropriate voltage level.

First secondary circuit 23 includes a full-bridge rectifier circuit electrically coupled with first secondary winding 222 of transformer 22. First secondary circuit 23 additionally includes a first secondary inductor Lr1, a first secondary capacitor Cr, and a plurality of switches S5, S6, S7, S8. A first secondary voltage across two terminals of first secondary winding 222 of transformer 22 is rectified by first secondary circuit 23. A second-port voltage Vo1 is outputted to a first load (not shown) through second terminals 231 and 232 of first secondary circuit 23. Second terminals 231 and 232 of first secondary circuit 23 are usually electrically coupled with the high voltage battery port of the on-board charger. The voltage of the high voltage battery port can be in the range between 270V and 450V, in the range between 550v and 850V, or in any other appropriate voltage range.

Second secondary circuit 24 includes a full-bridge rectifier circuit electrically coupled with second secondary winding 223 of transformer 22. Second secondary circuit 24 additionally includes a second secondary inductor Lr2 and a plurality of switches S9, S10, S11, S12. A second secondary voltage across two terminals of second secondary winding 223 of transformer 22 is rectified by second secondary circuit 24. A third-port voltage Vo2 is outputted to a second load (not shown) through third terminals 241 and 242 of second secondary circuit 24. Third terminals 241 and 242 of second secondary circuit 24 are usually electrically coupled with the low voltage battery port of the on-board charger. The voltage of the low voltage battery port can be in the range between 9V and 16V, or in any other appropriate voltage range.

As mentioned above, the second-port voltage from first secondary winding 222 (i.e., the voltage from a first output port) is higher than the third-port voltage from second secondary winding 223 (i.e., the voltage from a second output port). In other words, second terminals 231 and 232 are connected with the high voltage battery port of the on-board charger, and third terminals 241 and 242 are connected with the low voltage battery port of the on-board charger. It is noted that the circuitry topologies of primary circuit 21, first secondary circuit 23, and second secondary circuit 24 are not limited to the above-mentioned embodiments and may be varied according to the practical requirements.

In one embodiment, power module 2 can be operated in one of four working modes.

In the first working mode, power module 2 receives supply voltage Vin. Supply voltage Vin is converted by transformer 22. Second-port voltage Vo1 is outputted from first secondary circuit 23 to the first load. In the first working mode, power module 2 is in a Boost SRC working mode.

In the second working mode, power module 2 receives supply voltage Vin. Supply voltage Vin is converted by transformer 22. In addition, second port voltage Vo1 is outputted from first secondary circuit 23 to the first load (i.e., the high voltage battery port), and third-port voltage Vo2 is outputted from second secondary circuit 24 to the second load (i.e., the low voltage battery port). In the second working mode, power module 2 is in a Boost SRC and Dual active bridge (DAB) working mode.

In the third working mode, second terminals 231 and 232 receive the electric power from the high voltage battery port. The electric power is converted by transformer 22, and the converted electric power is transmitted to second secondary circuit 24. Consequently, third-port voltage Vo2 is outputted from second secondary circuit 24 to the second load (i.e., the low voltage battery port). In the third working mode, power module 2 is in the Boost SRC working mode, which is equivalent to the conventional APM power mode.

In the fourth working mode, second terminals 231 and 232 receive the electric power from the high voltage battery port. The electric power is converted by transformer 22, and the converted electric power is transmitted to primary circuit 21. Consequently, supply voltage Vin outputted from primary circuit 21 is fed back to the power grid or an AC power equipment. This working mode is the Boost SRC working mode, which is equivalent to the conventional inverter status.

Consequently, power module 2 charges the high voltage battery in the first working mode, or power module 2 simultaneously charges the high voltage battery and the low voltage battery in the second working mode. The low voltage battery is charged by the auxiliary power module when power module 2 is in the third working mode. The electric power is fed back from the high voltage battery to the power grid or converted into AC current when power module 2 is in the fourth working mode. Moreover, as shown in FIG. 5, in this embodiment, power module 2 requires three magnetic elements only. The three magnetic elements include transformer 22, first secondary inductor Lr1 and the second secondary inductor Lr2. Second secondary inductor Lr2 is connected with third terminals 241 and 242 through second secondary circuit 24. Third terminals 241 and 242 form the low voltage battery port. Consequently, the current flowing through second secondary inductor Lr2 is higher, and second secondary inductor Lr2 has lower inductance and less turn number. Second secondary inductor Lr2 can be integrated with transformer 22 more easily. In one embodiment, transformer 22 and second secondary inductor Lr2 of the three magnetic elements are integrated into a single magnetic assembly 1.

Referring to FIGS. 2, 3 and 4. In this embodiment, magnetic assembly 1 includes a magnetic core 3 and a winding assembly 4. The left side of FIG. 4 is a cross-sectional view of magnetic core 3 as shown in FIG. 2. The right side of FIG. 4 is a cross-sectional view of the combination of magnetic core 3 and winding assembly 4 as shown in FIG. 2. In order to clearly describe the structure of magnetic core 3 and winding assembly 4, only winding assembly 4 wound around the right side of magnetic core 3 is shown in FIG. 4. However, in the actual situation, winding assembly 4 is wound around the entire magnetic core 3. In this embodiment, magnetic core 3 includes a first magnetic leg 31 and a second magnetic leg 32. As shown in FIGS. 3 and 4, the first magnetic leg 31 has an elliptic cylinder profile, a cylindrical profile or any other appropriate profile. The present disclosure is not limited thereto. The second magnetic leg 32 is disposed adjacent to the first magnetic leg 31. Second magnetic leg 32 has a first side 321, a second side 322, a third side 323 and a fourth side 324. First side 321 and second side 322 are opposed to each other. Third side 323 and fourth side 324 are opposed to each other. Moreover, third side 323 and fourth side 324 are disposed between first side 321 and second side 322. Second magnetic leg 32 is not limited to the shape shown in FIG. 3. Second magnetic leg 32 may be cylinder-shaped. The four sides can be served as four reference directions or orientations. As shown in FIG. 4, a channel 325 is formed between first magnetic leg 31 and second side 322 of second magnetic leg 32.

Winding assembly 4 includes a first winding 41, a second winding 42, and a third winding 43. First winding 41 is used as primary winding 221 of transformer 22 as shown in FIG. 5. First winding 41 is wound around first magnetic leg 31. A part of first winding 41 is accommodated within channel 325. Second winding 42 is used as first secondary winding 222 of transformer 22 as shown in FIG. 5. Second winding 42 is also wound around first magnetic leg 31. A part of second winding 42 is also accommodated within channel 325. First winding 41 is disposed between first magnetic leg 31 and second winding 42. Third winding 43 is used as second secondary winding 223 of transformer 22 and second secondary inductor Lr2, which are connected with each other in series. In one embodiment, a copper sheet is used as third winding 43 to achieve the conducting function and the heat dissipating function. In one embodiment, the turn number of third winding 43 is one. Third winding 43 is wound around second magnetic leg 32 and first magnetic leg 31. First winding 41 and second winding 42 are at least partially covered by third winding 43. The projection of third winding 43 with respect to second magnetic leg 32 are partially overlapped with first side 321, third side 323, or fourth side 324 of second magnetic leg 32. Second winding 42 is disposed between first winding 41 and third winding 43. In some embodiments, first winding 41 is used as first secondary winding 222 of transformer 22 as shown in FIG. 5; second winding 42 is used as primary winding 221 of transformer 22 as shown in FIG. 5; and third winding 43 is used as both of second secondary winding 223 of transformer 22 and second secondary inductor Lr2 connected in series as shown in FIG. 5.

As mentioned above, first winding 41 and second winding 42 of magnetic assembly 1 are wound around first magnetic leg 31, and third winding 43 is wound around first magnetic leg 31 and second magnetic leg 32. Due to the arrangement of magnetic core 3 and winding assembly 4, transformer 22 and second secondary inductor Lr2 can be integrated into magnetic assembly 1. Magnetic assembly 1 and first secondary inductor Lr1 of power module 2 can achieve the integration function of the OBC circuit and the APM circuit. The conventional hybrid power module with the combination of the on-board charger OBC and the auxiliary power module APM requires at least 4 or 5 magnetic elements. Magnetic assembly 1 of the present disclosure only needs two magnetic elements. Consequently, power module 2 with magnetic assembly 1 of the present disclosure has smaller spatial volume, lighter weightiness, and lower cost.

Referring again to FIGS. 3 and 4, magnetic assembly 1 further includes a first magnetic base 5 and a second magnetic base 6. First magnetic base 5 has a first side 51, a second side 52, and a lateral side 53. First side 51 and second side 52 of first magnetic base 5 are opposed to each other. Lateral side 53 of first magnetic base 5 is disposed between first side 51 and second side 52 of first magnetic base 5. Consequently, lateral side 53 of first magnetic base 5 is connected with the edge of first side 51 of magnetic base 5 and the edge of second side 52 of magnetic base 5. Second magnetic base 6 has a first side 61, a second side 62, and a lateral side 63. First side 61 and second side 62 of second magnetic base 6 are opposed to each other. Lateral side 63 of second magnetic base 6 is disposed between first side 61 and second side 62 of second magnetic base 6. Consequently, lateral side 63 of second magnetic base 6 is connected with the edge of first side 61 of second magnetic base 6 and the edge of second side 62 of second magnetic base 6. First side 61 of second magnetic base 6 is disposed between second side 62 of second magnetic base 6 and first side 51 of first magnetic base 5. First side 51 of first magnetic base 51 is disposed between second side 52 of first magnetic base 5 and first side 61 of second magnetic base 6. The two ends of first magnetic leg 31 are connected with first side 51 of first magnetic base 5 and first side 61 of second magnetic base 6, respectively. The two ends of second magnetic leg 32 are connected with first side 51 of first magnetic base 5 and first side 61 of second magnetic base 6, respectively.

In this embodiment, magnetic core 3 further includes a shared lateral leg 33. The two ends of shared lateral leg 33 are connected with lateral side 53 of first magnetic base 5 and lateral side 63 of second magnetic base 6, respectively. Second magnetic leg 32 is disposed between shared lateral leg 33 and first magnetic leg 31.

Figure 6:
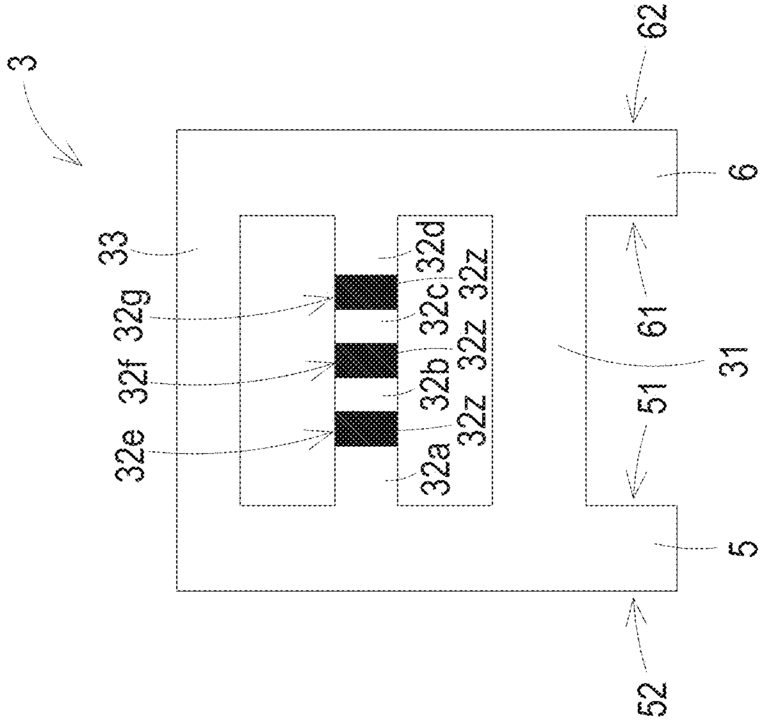
FIG. 6 is a schematic side view illustrating the magnetic core of the magnetic assembly as shown in FIG. 2.

In some embodiments, in order to reduce the winding loss of winding assembly 4, second magnetic leg 32 can include a plurality of sub-legs. Moreover, a plurality of air gaps can be formed between the plurality of sub-legs. FIG. 6 is a side view schematically illustrating magnetic core 3 of magnetic assembly 1 as shown in FIG. 2. As shown in FIGS. 3 and 6, second magnetic leg 32 includes a first sub-leg 32*a*, a second sub-leg 32*b*, a third sub-leg 32*c*, and a fourth sub-leg 32*d*. First sub-leg 32*a*, second sub-leg 32*b*, third sub-leg 32*c*, and fourth sub-leg 32*d* are discretely disposed. First sub-leg 32*a* is connected with first side 51 of first magnetic base 5. Second sub-leg 32*b* is disposed between first sub-leg 32*a* and third sub-leg 32*c*. Third sub-leg 32*c* is disposed between second sub-leg 32*b* and fourth sub-leg 32*d*. Fourth sub-leg 32*d* is connected with first side 61 of second magnetic base 6. In this embodiment, a first air gap 32*e* is formed between first sub-leg 31*a* and second sub-leg 31*b*; a second air gap 32*f* is formed between second sub-leg 32*b* and third sub-leg 32*c*; and a third air gap 32*g* is formed between third sub-leg 32*c* and fourth sub-leg 32*d*. In some embodiments, as shown in FIG. 6, magnetic assembly 1 further includes an air gap forming material 32*z*. Air gap forming material 32*z* is a non-conductive and non-magnetic material. Air gap forming material 32*z* is filled into first air gap 32*e* to secure first sub-leg 32*a* and second sub-leg 32*b* in place. Air gap forming material 32*z* is filled into second air gap 32*f* to secure second sub-leg 32*b* and third sub-leg 32*c* in place. In addition, air gap forming material 32*z* is filled into third air gap 32*g* to secure third sub-leg 32*c* and fourth sub-leg 32*d* in place. In some embodiments, second air gap 32*f* is a vacant space without being filled with any material. It is noted that the number of sub-legs of second magnetic leg 32 is not restricted. For example, second magnetic leg 32 may include 2, 4 or 10 sub-legs. The sub-legs and the air gaps are alternately disposed.

Figure 7:
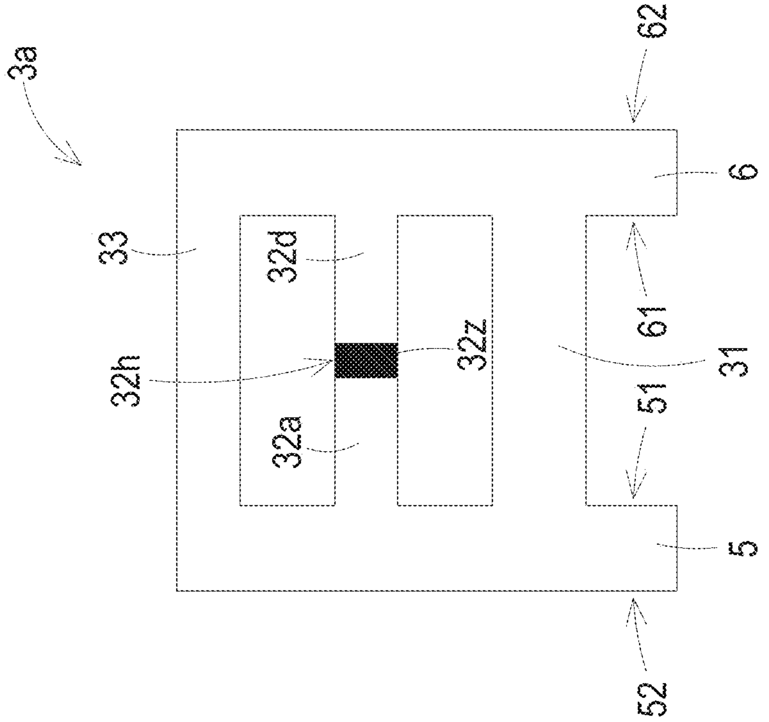
FIG. 7 is a side view schematically illustrating a variant example of the magnetic core of the magnetic assembly as shown in FIG. 2.

In some embodiments, second magnetic leg 32 includes two sub-legs only. FIG. 7 is a side view schematically illustrating a variant example of magnetic core 3 of magnetic assembly 1 as shown in FIG. 2. As shown in FIG. 7, a magnetic core 3*a* includes first sub-leg 32*a* and fourth sub-leg 32*d* only. The disposing positions of first sub-leg 32*a* and fourth sub-leg 32*d* are similar to those in FIG. 6, and thus not redundantly described herein. In this embodiment, second magnetic leg 32 includes a single fourth air gap 32*h* only. Fourth air gap 32*h* is disposed between first sub-leg 32*a* and fourth sub-leg 32*d*. Similarly, air gap forming material 32*z* may be filled into fourth air gap 32*h* to secure first sub-leg 32*a* and fourth sub-leg 32*d* in place.

Figure 8:
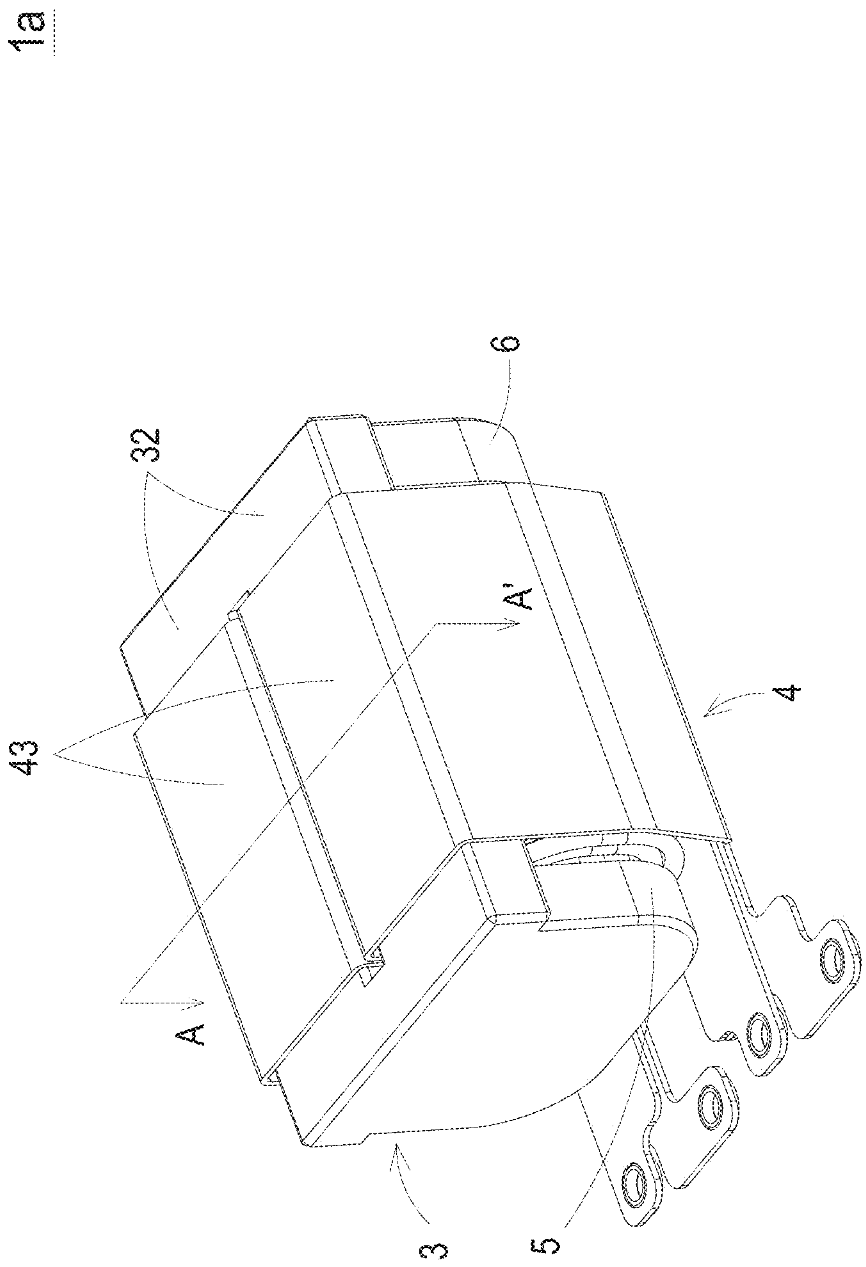
FIG. 8 is a perspective view schematically illustrating a magnetic assembly according to a second embodiment of the present disclosure.
Figure 9:
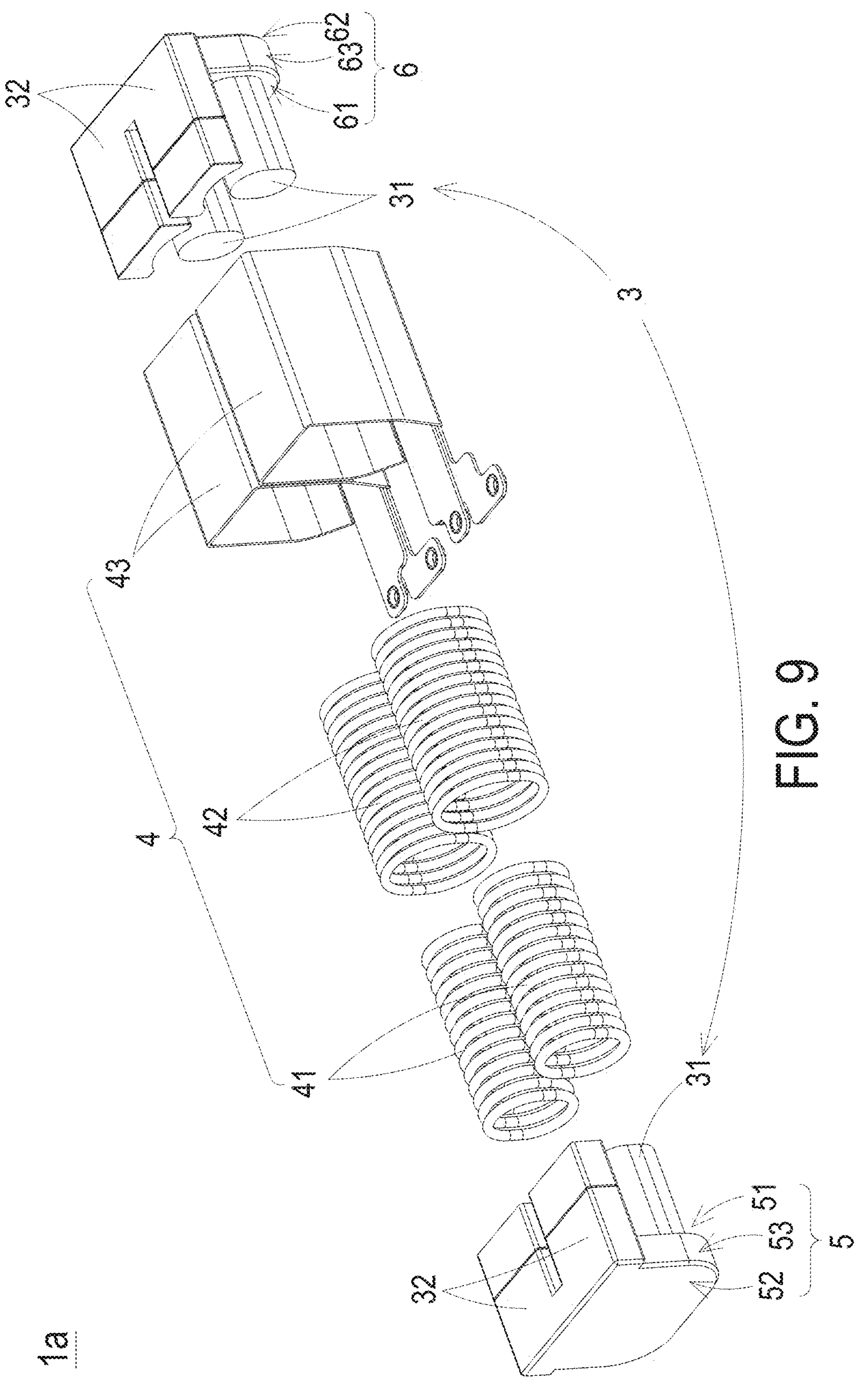
FIG. 9 is an exploded view schematically illustrating the magnetic assembly as shown in FIG. 8.
Figure 10:
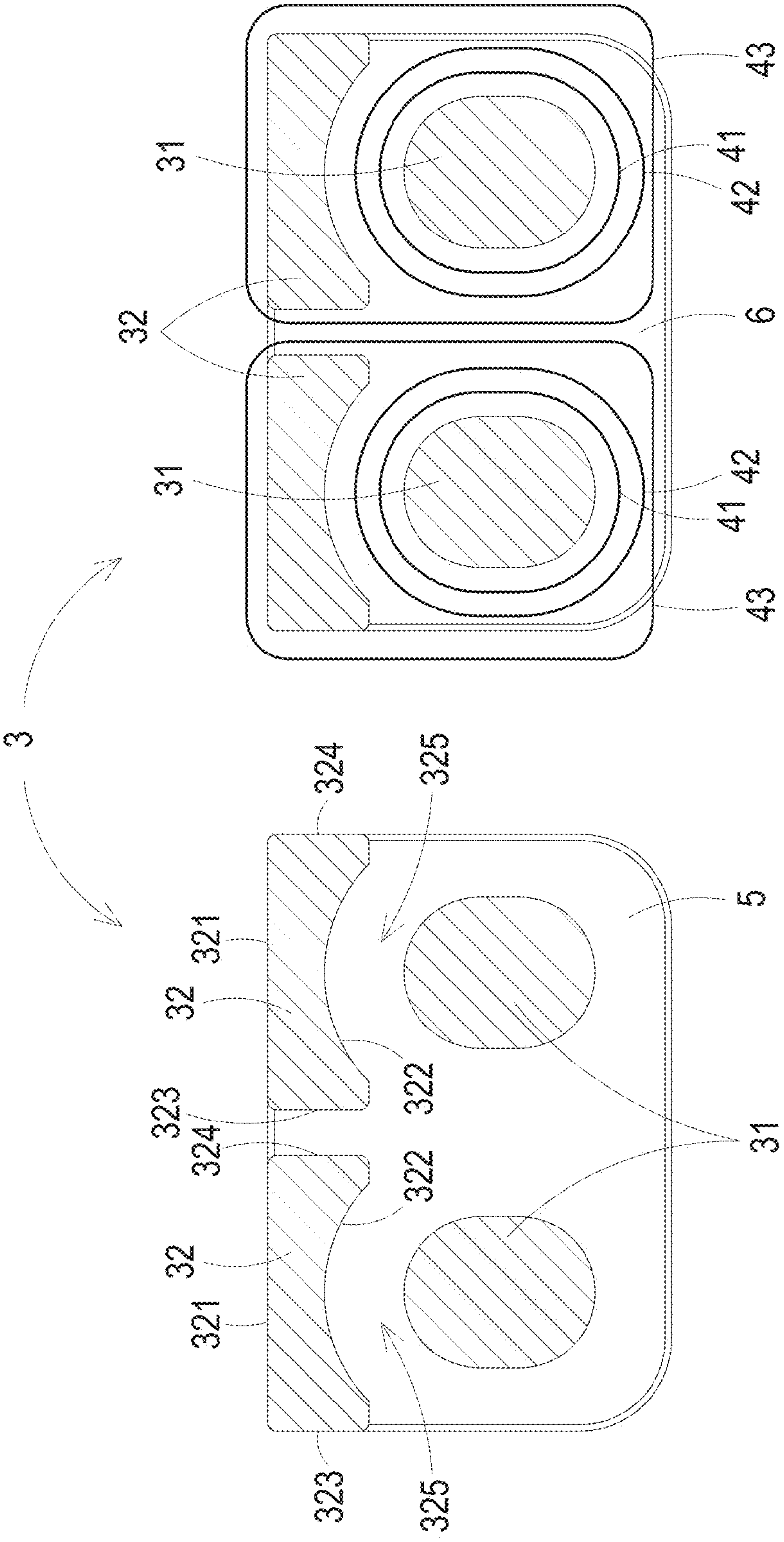
FIG. 10 is a cross-sectional view schematically illustrating the magnetic assembly as shown in FIG. 8 and taken along line A-A'.
Figure 11:
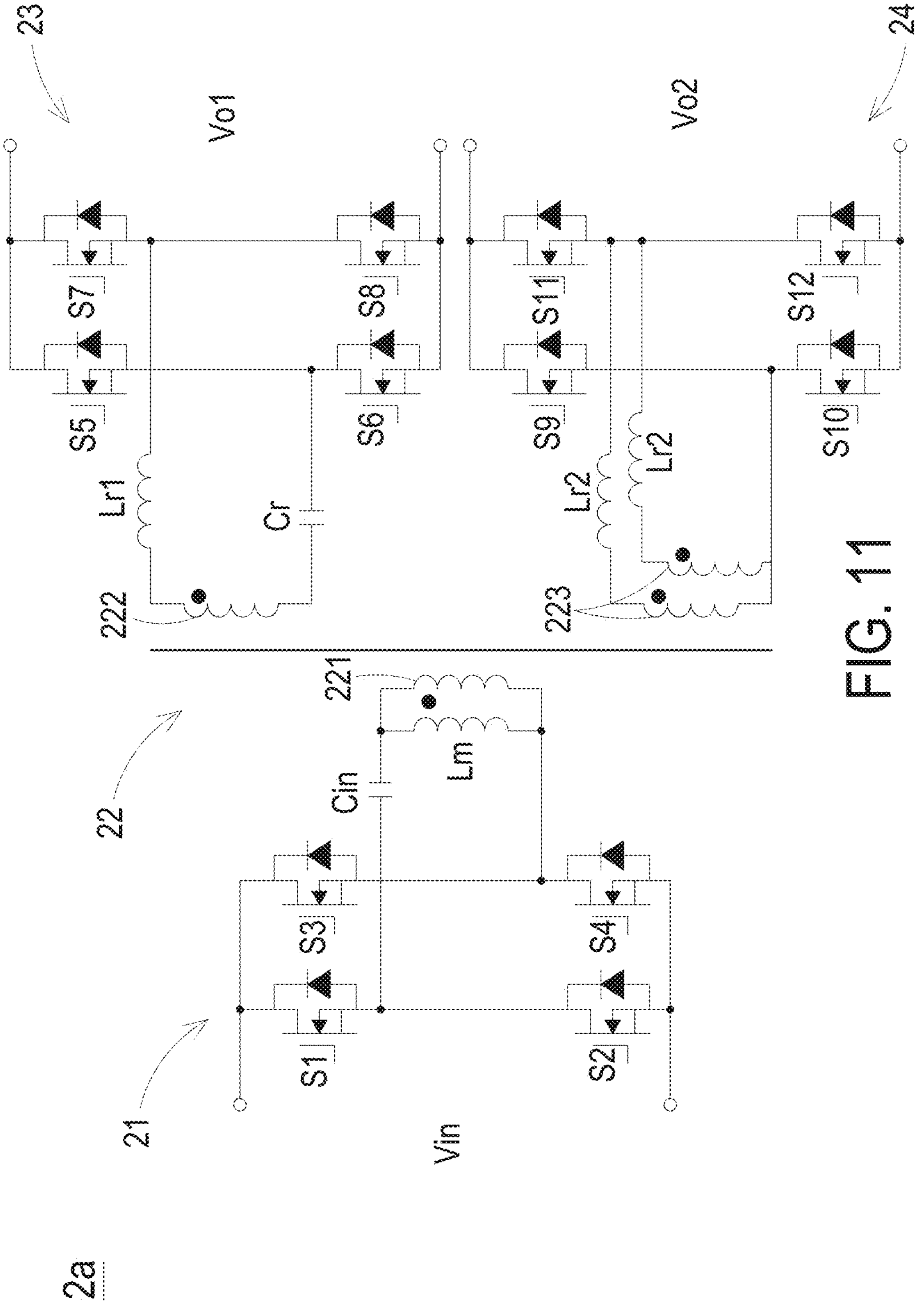
FIG. 11 is a schematic circuit diagram illustrating a circuitry topology of a power module with the magnetic assembly as shown in FIG. 8.

Please refer to FIGS. 8, 9, 10, and 11. FIG. 8 is a perspective view schematically illustrating a magnetic assembly 1*a* according to a second embodiment of the present disclosure. FIG. 9 is an exploded view schematically illustrating magnetic assembly 1*a* as shown in FIG. 8. FIG. 10 is a cross-sectional view schematically illustrating magnetic assembly 1*a* as shown in FIG. 8, taken along line A-A'. FIG. 11 is a schematic circuit diagram illustrating a circuitry topology of a power module 2*a* with magnetic assembly 1*a* as shown in FIG. 8.

The structure of magnetic assembly 1*a* as shown in FIG. 8 is similar to that of magnetic assembly 1 as shown in FIG. 2 of the first embodiment. Component parts and elements corresponding to those of the first embodiment are designated by identical numeral references, and detailed descriptions thereof are omitted. Magnetic assembly 1 as shown in FIG. 2 includes a single magnetic core 3 and a single winding assembly 4 only. In contrast, magnetic assembly 1*a* of this embodiment includes two magnetic cores 3 and two winding assemblies 4. As shown in FIG. 9, each magnetic core 3 includes a first magnetic leg 31 and a second magnetic leg 32. The two magnetic cores 3 have respective first magnetic legs 31. The two ends of magnetic leg 31 are connected with first side 51 of first magnetic base 5 and first side 61 of second magnetic base 6, respectively. Moreover, the two magnetic cores 3 have respective second magnetic legs 32. The two ends of magnetic leg 32 are connected with lateral side 53 of first magnetic base 5 and lateral side 63 of second magnetic base 6, respectively. Each winding assembly 4 includes a first winding 41, a second winding 42, and a third winding 43. The left side of FIG. 10 is a cross-sectional view illustrating the two magnetic cores 3 as shown in FIG. 9. The right side of FIG. 10 is a cross-sectional view illustrating the two magnetic cores 3 and the two winding assemblies 4 as shown in FIG. 9. In order to clearly describe the structures of magnetic cores 3 and winding assemblies 4, only winding assemblies 4 wound around the right side of the magnetic cores 3 are shown in FIG. 10. However, in the actual situation, each of winding assemblies 4 is wound around the entirety of a corresponding one of magnetic cores 3. In this embodiment, each first winding 41 of winding assembly 4 is wound around first magnetic leg 31 of the corresponding magnetic core 3; each second winding 42 of winding assembly 4 is wound around first magnetic leg 31 of the corresponding magnetic core 3; and each third winding 43 of winding assembly 4 is wound around first magnetic leg 31 and second magnetic leg 32 of the corresponding magnetic core 3. The winding methods of first winding 41, second winding 42, and third winding 43 of winding assembly 4 as shown in FIG. 10 are similar to the winding methods of first winding 41, second winding 42, and third winding 43 of winding assembly 4 as shown in FIG. 4, and thus not redundantly described herein.

In this embodiment, the directions of magnetic fluxes flowing through first magnetic legs 31 of the two magnetic cores 3 are opposed to each other, and the directions of magnetic fluxes flowing through second magnetic legs 32 of the two magnetic cores 3 are also opposed to each other. Due to the arrangement of the magnetic flux directions, magnetic assembly 1*a* of this embodiment can form an effective magnetic path without the need of disposing the common shared magnetic leg. That is, magnetic assembly 1*a* can still be operated normally.

In the circuitry topology as shown in FIG. 11, the two first windings 41 are collaboratively formed as primary winding 221 of transformer 22 of power module 2*a* as shown in FIG. 11. For example, primary winding 221 can be formed by connecting the two first windings 41 in series or in parallel (not shown). The two second windings 42 are collaboratively formed as first secondary winding 222 of transformer 22 as shown in FIG. 11. For example, first secondary winding 222 can be formed by connecting the two second windings 42 in series or in parallel (not shown). The two third windings 43 are formed as the two second secondary windings 233 of transformer 22 and the two secondary inductors Lr2, respectively. The circuitry topology of power module 2*a* is similar to that of power module 2 as shown in FIG. 5, and thus not redundantly described herein.

Figure 12A:
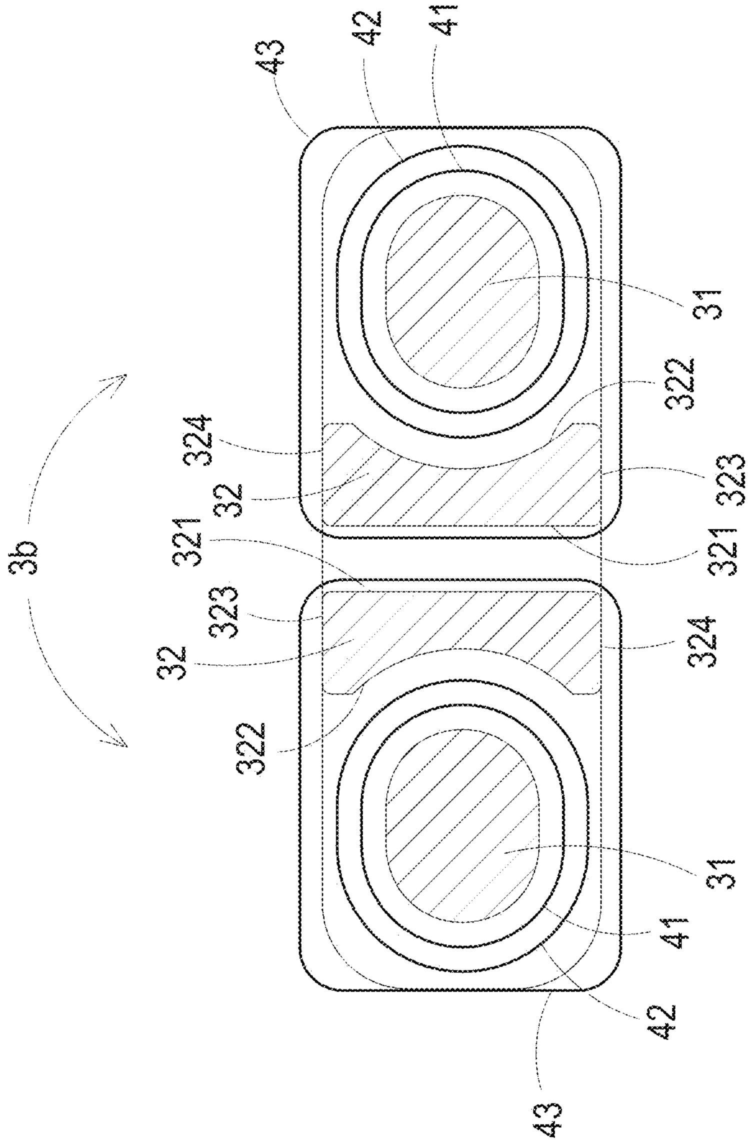
FIG. 12A is a cross-sectional view schematically illustrating a variant example of the magnetic assembly as shown in FIG. 8.
Figure 12B:
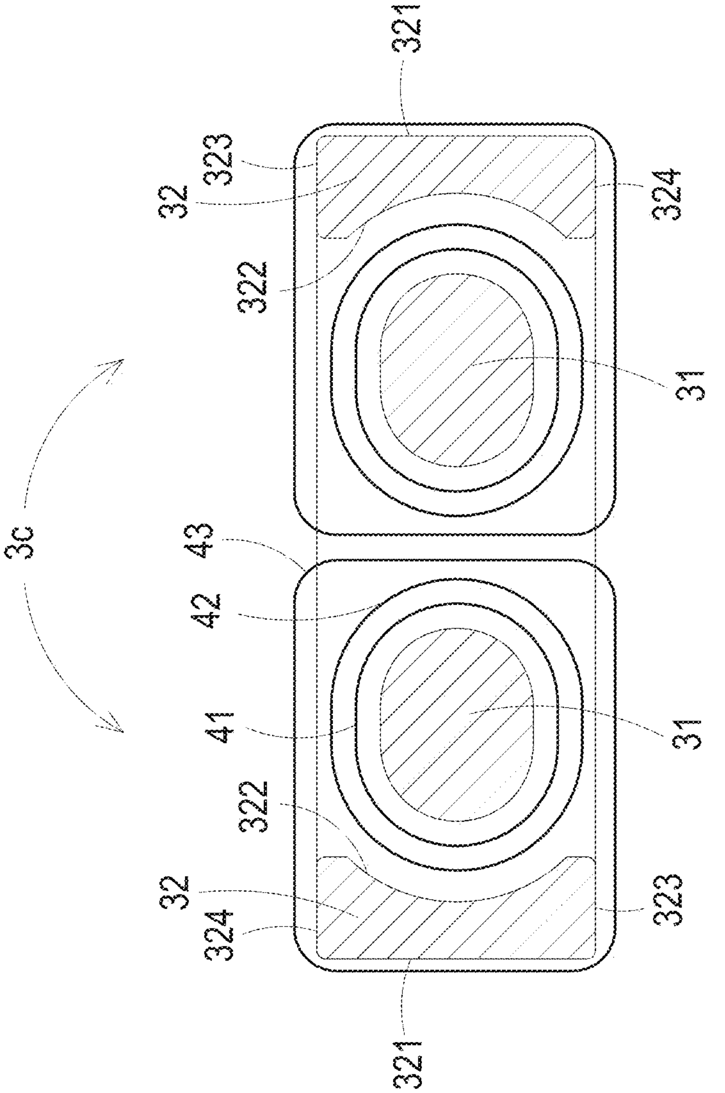
FIG. 12B is a cross-sectional view schematically illustrating another variant example of the magnetic assembly as shown in FIG. 8.

The disposing positions of second magnetic legs 32 of the two magnetic cores 3 will be described in more details as follows. The two second magnetic legs 32 on the left side of FIG. 10 (i.e., the two second magnetic legs 32 connected with first magnetic base 5) are taken as examples. In this embodiment, as shown in FIG. 10, third side 323 of second magnetic leg 32 of one of the two magnetic cores 3 and fourth side 324 of second magnetic leg 32 of the other of the two magnetic cores 3 are disposed adjacent to each other. Moreover, the two first magnetic legs 31 of the two magnetic cores 3 are disposed adjacent to each other. It is noted that the disposing positions of the two first magnetic legs 31 and the two second magnetic legs 32 of the two magnetic cores 3 are not restricted. In order to achieve a better spatial configuration, the disposing positions of the two first magnetic legs 31 and the two second magnetic legs 32 may be varied according to the practical requirements. FIG. 12A is a cross-sectional view schematically illustrating a variant example of magnetic assembly 1*a* as shown in FIG. 8. FIG. 12B is a cross-sectional view schematically illustrating another variant example of magnetic assembly 1*a* as shown in FIG. 8. In the embodiment of FIG. 12A, first side 321 of second magnetic leg 32 of one of the two magnetic cores 3*b* and first side 321 of second magnetic leg 32 of the other of the two magnetic cores 3 are disposed adjacent to each other. Moreover, the two second magnetic legs 32 of the two magnetic cores 3*b* are disposed between the two first magnetic legs 31. In some other embodiments, as shown in FIG. 12B, the two first magnetic legs 31 of the two magnetic cores 3*c* are disposed between second sides 322 of the two second magnetic legs 32 of the two magnetic cores 3.

Alternatively, in some embodiments, a magnetic assembly of the present disclosure can include more than three magnetic cores and more than three winding assemblies. In case that the number of the magnetic cores is odd (i.e., 1, 3, 5, . . . ), at least one shared lateral leg is required. In case that the number of the magnetic cores is even (i.e., 2, 4, 6, . . . ), the directions of the magnetic fluxes flowing in any two adjacent magnetic cores are opposite (i.e., the reference directions of the magnetic fluxes are positive and negative, respectively, and are complementary to each other). Under this circumstance, the shared lateral leg is not required. Moreover, the number of first magnetic legs 31, the number of second magnetic legs 32, and the number of the winding assemblies are equal. The disposing positions of the associated components are similar to those in the first and the second embodiments, and thus not redundantly described herein.

Figure 13:
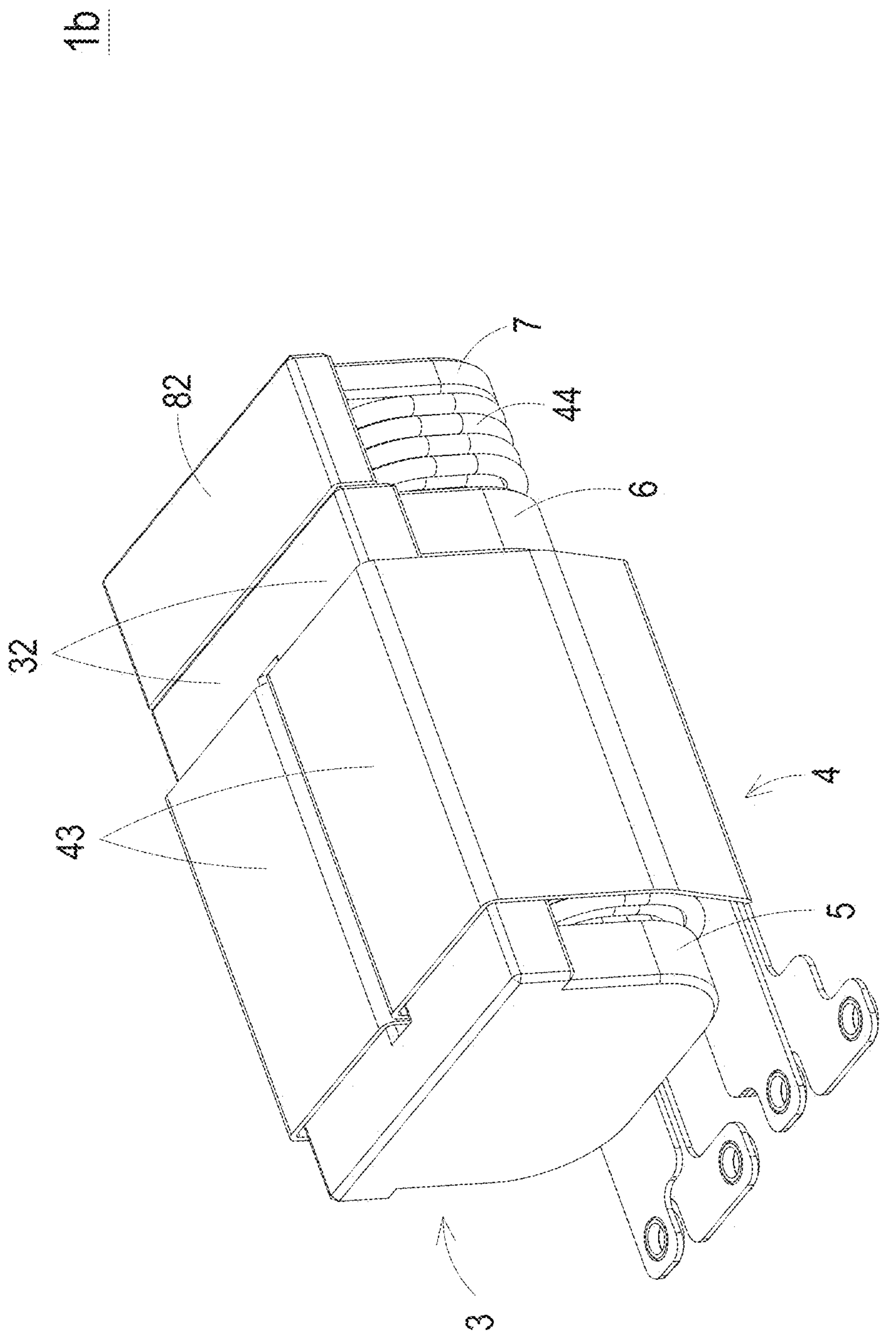
FIG. 13 is a perspective view schematically illustrating a magnetic assembly according to a third embodiment of the present disclosure.
Figure 14:
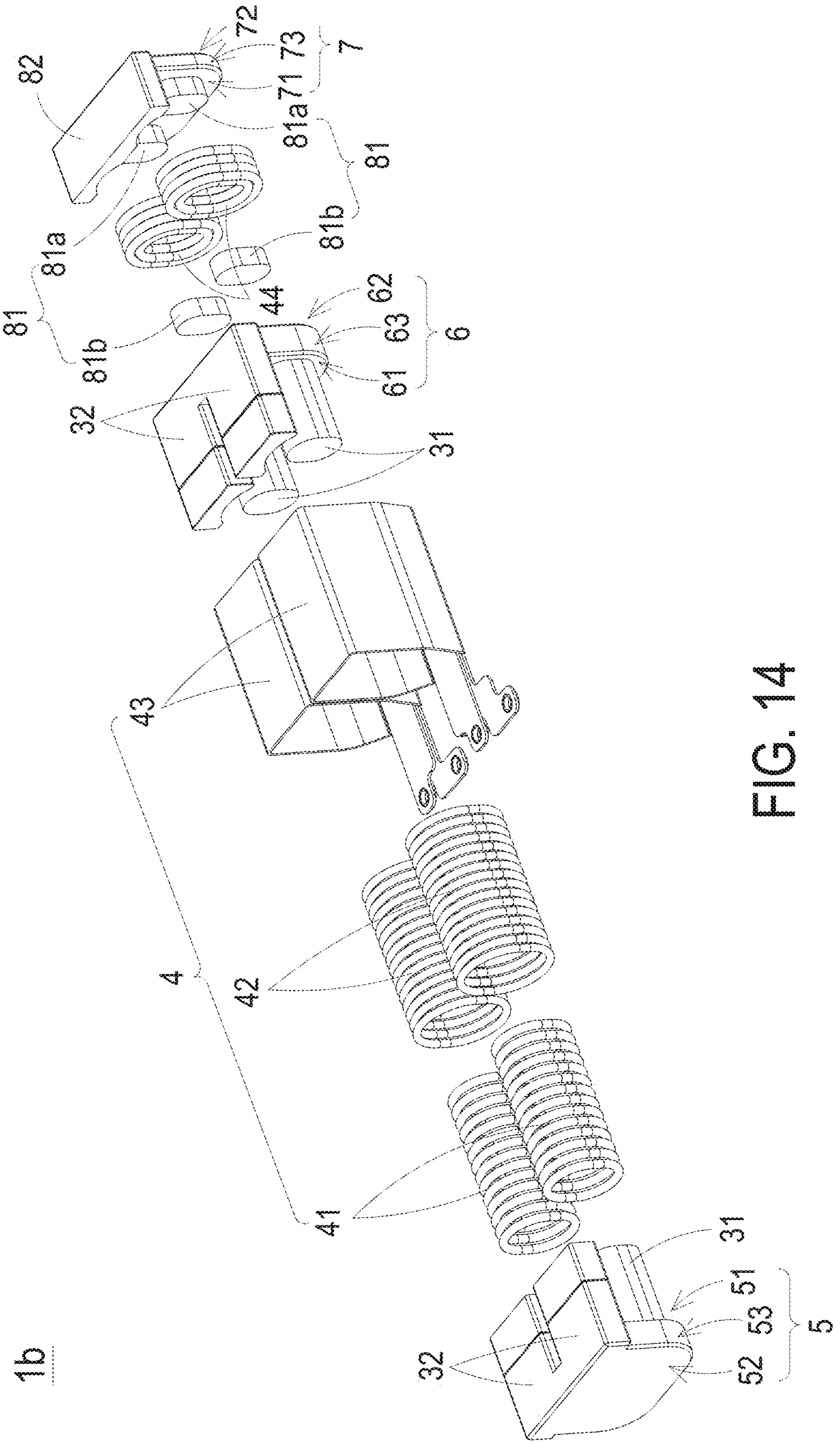
FIG. 14 is an exploded view schematically illustrating the magnetic assembly as shown in FIG. 13.

Please refer to FIGS. 13 and 14. FIG. 13 is a perspective view schematically illustrating a magnetic assembly 1*b* according to a third embodiment of the present disclosure. FIG. 14 is an exploded view schematically illustrating magnetic assembly 1*b* as shown in FIG. 13. The structure of magnetic assembly 1*b* in this embodiment is similar to that of magnetic assembly 1*a* as shown in FIGS. 8 and 9 in the second embodiment. Component parts and elements corresponding to those of the second embodiment are designated by identical numeral references, and detailed descriptions thereof are omitted. In comparison with magnetic assembly 1*a* of the second embodiment as shown in FIGS. 8 and 9, magnetic assembly 1*b* further includes a third magnetic base 7, at least one third magnetic leg 81, and a fourth magnetic leg 82, or alternatively, magnetic assembly 1*b* further includes a third magnetic base 7 and two third magnetic legs 81. In this particular embodiment, magnetic assembly 1*b* includes a third magnetic base 7, two third magnetic legs 81, and a fourth magnetic leg 82. Third magnetic base 7 has a first side 71, a second side 72, and a lateral side 73. First side 71 and second side 72 of third magnetic base 7 are opposed to each other. Lateral side 73 of third magnetic base 7 is disposed between first side 71 and second side 72 of third magnetic base 7. Consequently, lateral side 73 of third magnetic base 7 is connected with the edge of first side 71 and the edge of second side 72 of third magnetic base 7. Moreover, first side 71 of third magnetic base 7 is disposed between second side 62 of second magnetic base 6 and second side 72 of third magnetic base 7.

In this embodiment, magnetic assembly 1*b* includes two third magnetic legs 81. The two ends of each third magnetic leg 81 are connected with second side 62 of second magnetic base 6 and first side 71 of third magnetic base 7, respectively. The disposing position of third magnetic leg 81 on second magnetic base 6 is aligned with the disposing position of first magnetic leg 31 on second magnetic base 6. It is noted that the disposing positions of third magnetic leg 81 and first magnetic leg 31 on second magnetic base 6 are not restricted. Alternatively, the disposing position of third magnetic leg 81 on second magnetic base 6 is not aligned with the disposing position of first magnetic leg 31 on second magnetic base 6. The two ends of fourth magnetic leg 82 are connected with second side 62 of second magnetic base 6 and first side 71 of third magnetic base 7, respectively. Alternatively, the two ends of fourth magnetic leg 82 are connected with lateral side 63 of second magnetic base 6 and lateral side 73 of third magnetic base 7, respectively. In this embodiment, each of the two winding assemblies 4 further includes a fourth winding 44. Fourth winding 44 of winding assembly 4 is wound around the corresponding third magnetic leg 81. Because fourth winding 44 can be used as first secondary inductor Lr1 as shown in FIG. 11, first secondary inductor Lr1 as shown in FIG. 11 can be integrated into magnetic assembly 1*b*. Consequently, all of magnetic elements in this embodiment are integrated into magnetic assembly 1*b*.

Figure 15:
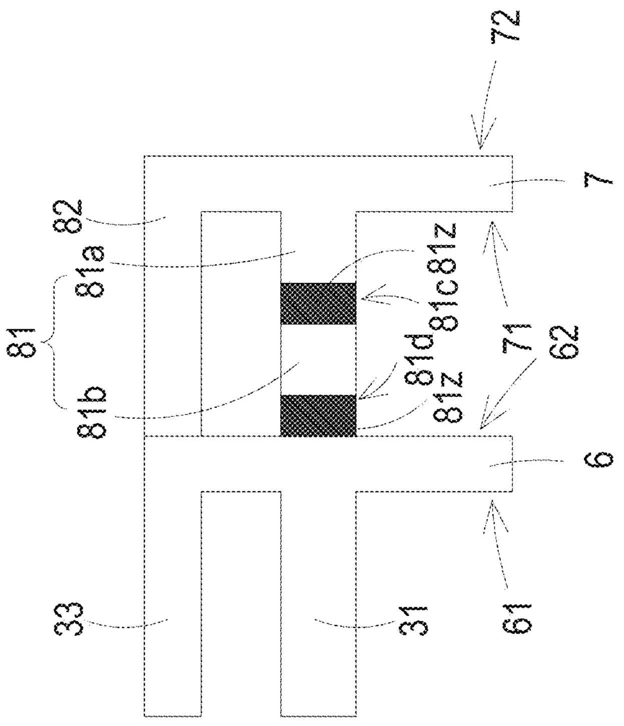
FIG. 15 is a side view schematically illustrating the magnetic core of the magnetic assembly as shown in FIG. 13.

In some embodiments, in order to reduce the winding loss of winding assembly 4, third magnetic leg 81 includes a plurality of sub-legs. A plurality of air gaps can be formed between the plurality of sub-legs. Please refer to both FIGS. 14 and 15. FIG. 15 is a side view schematically illustrating magnetic core 3 of magnetic assembly 1*b* as shown in FIG. 13. As shown in FIG. 15, each third magnetic leg 81 includes a fifth sub-leg 81*a* and a sixth sub-leg 81*b*. Fifth sub-leg 81*a* and sixth sub-leg 81*b* are discretely disposed. Fifth sub-leg 81*a* is connected with first side 71 of third magnetic base 7. Sixth sub-leg 81*b* is disposed between fifth sub-leg 81*a* and second side 62 of second magnetic base 6. A fifth air gap 81*c* is formed between fifth sub-leg 81*a* and sixth sub-leg 81*b*. A sixth air gap 81*d* is formed between sixth sub-leg 81*b* and second side 62 of second magnetic base 6. In this embodiment, air gap forming material 81*z* is filled into fifth air gap 81*c* and sixth air gap 81*d* to secure fifth sub-leg 81*a* and sixth sub-leg 81*b* in place, as described above, and thus not redundantly described herein.

Figure 16:
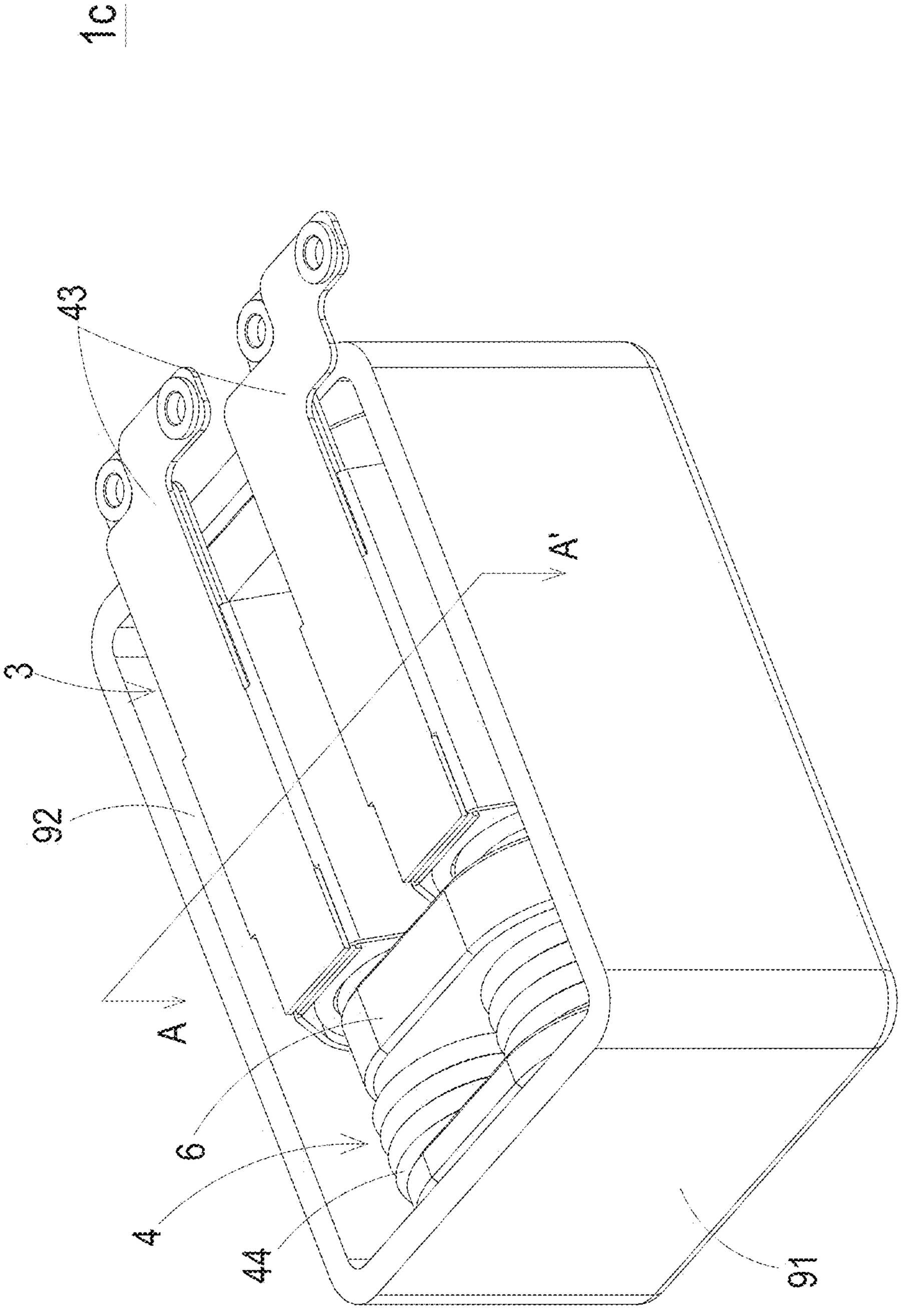
FIG. 16 is a perspective view schematically illustrating a magnetic assembly according to a fourth embodiment of the present disclosure.
Figure 17:
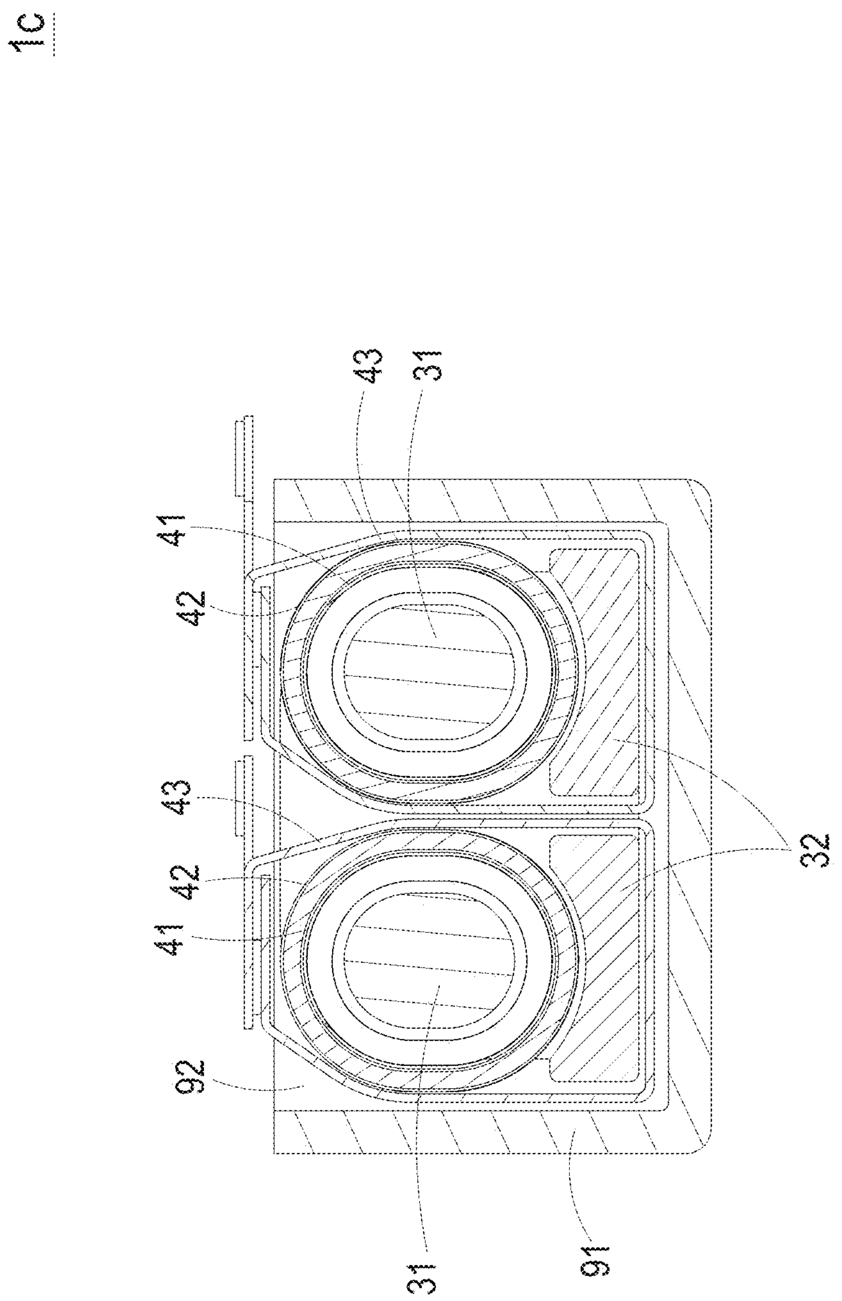
FIG. 17 is a schematic cross-sectional view illustrating the magnetic assembly as shown in FIG. 16 and taken along line A-A'.

Please refer to FIGS. 16 and 17. FIG. 16 is a perspective view schematically illustrating a magnetic assembly 1*c* according to a fourth embodiment of the present disclosure. FIG. 17 is a cross-sectional view schematically illustrating magnetic assembly 1*c* as shown in FIG. 16, taken along line A-A'. The structure of magnetic assembly 1*c* in this embodiment is similar to that of magnetic assembly 1*b* as shown in FIGS. 13 and 14 of the third embodiment. Component parts and elements corresponding to those of magnetic assembly 1*b* of the third embodiment are designated by identical numeral references, and detailed descriptions thereof are omitted. In comparison with magnetic assembly 1*b* of the third embodiment as shown in FIGS. 13 and 14, magnetic assembly 1*c* in this embodiment further includes a case 91 and a thermal glue 92. In some embodiments, case 91 is made of aluminum or copper. In addition, the bottom plate and/or the chamber wall of case 91 further includes heat dissipating channels (not shown) for allowing a cooling medium (e.g., water, air, etc.) to flow through. Case 91 is configured to accommodate magnetic cores 3 and winding assemblies 4 therein. Thermal glue 92 is filled into the vacant apace between case 91 and magnetic cores 3 and winding assemblies 4. In this embodiment, thermal glue 92 and third winding 43 (e.g., a copper sheet) can increase the heat dissipation efficiency of magnetic assembly 1*c*. The heat generated by magnetic assembly 1*c* is transferred through magnetic core 3, first winding 41, second winding 42, third winding 43, thermal glue 92, and case 91 sequentially. Then, the heat from magnetic assembly 1*c* is dissipated away to the surrounding environment by the cooling medium in the heat dissipating channels of case 91 or through a forced convection mechanism (or a natural convection mechanism).

In view of the above descriptions, the present disclosure provides a magnetic assembly with the first winding and the second winding wound around the first magnetic leg, and the third winding wound around the first magnetic leg and the second magnetic leg. Due to the arrangement of the magnetic core and the winding assembly, the transformer and the second secondary inductor are integrated into the magnetic assembly. The magnetic assembly and the first secondary inductor of the power module can achieve the integration function of the OBC circuit and the APM circuit. The conventional hybrid power module with the combination of the on-board charger OBC and the auxiliary power module APM requires at least 4 or 5 magnetic elements. The magnetic assembly of the present disclosure needs only two magnetic elements or, upon further integration, needs only one magnetic element. Consequently, the power module with the magnetic assembly of the present disclosure has smaller spatial volume, lighter weightiness, and lower cost. Moreover, the first winding and the second winding are covered by the third winding. Consequently, the heat dissipation efficiencies of the magnetic core, the first winding, and the second winding are enhanced.

While embodiments of the present disclosure have been described in terms of what is presently considered to be the most practical and preferred embodiments, it is to be understood that other embodiments may be apparent to one of ordinary skill in the art upon review of the present disclosure. Accordingly, it is intended that the present disclosure covers any modifications and/or alterations so long as such modifications and/or alterations fall within the spirit and scope of the appended claims.

What is claimed is:

1. A magnetic assembly, comprising:

a magnetic core having a first magnetic leg and a second magnetic leg spatially separated from the first magnetic leg to define a spatial channel therebetween; and a winding assembly comprising a first winding, a second winding, and a third winding, the first and second windings being wound around the first magnetic leg with at least a part of the first and second windings being accommodated within the spatial channel, and the third winding being wound around the first and second magnetic legs;

wherein the first winding is disposed between the first magnetic leg and the second winding; and wherein the second winding is disposed between the first winding and the third winding, and the second magnetic leg is only wound with the third winding.

2. The magnetic assembly according to claim 1, wherein the second winding is connected with a first output port, and the third winding is connected with a second output port, wherein a voltage at the first output port is higher than a voltage at the second output port.

3. The magnetic assembly according to claim 1, wherein the first winding is connected with a first output port, and the third winding is connected with a second output port, wherein a voltage at the first output port is greater than a voltage at the second output port.

4. The magnetic assembly according to claim 1, wherein the magnetic core further comprises a first magnetic base and a second magnetic base, wherein the first and second magnetic legs are connected between the first and second magnetic bases.

5. The magnetic assembly according to claim 4, wherein the magnetic core further comprises a shared lateral leg connected between the first and second magnetic bases, wherein the second magnetic leg is disposed between the shared lateral leg and the first magnetic leg.

6. The magnetic assembly according to claim 4, wherein the second magnetic leg comprises one air gap or more air gaps.

7. The magnetic assembly according to claim 4, wherein the second magnetic leg comprises a plurality of discretely disposed sub-legs connected between the first and second magnetic bases, such that one air gap or more air gaps are formed between the sub-legs.

8. The magnetic assembly according to claim 4, wherein the second magnetic leg comprises a first sub-leg and a second sub-leg discretely disposed from the first sub-leg, wherein the first sub-leg is connected to the first magnetic base, and the second sub-leg is connected to the second magnetic base, wherein an air gap is formed between the first and second sub-legs.

9. The magnetic assembly according to claim 8, further comprising an air gap forming material filled in the air gap.

10. The magnetic assembly according to claim 4, wherein the magnetic core further comprises:

a third magnetic base, a third magnetic leg, and a fourth magnetic leg, the third and fourth magnetic legs being connected between the second magnetic base and the third magnetic base;

wherein the winding assembly further comprises a fourth winding wound around the third magnetic leg, thereby serving as a secondary inductor of the magnetic assembly.

11. The magnetic assembly according to claim 10, wherein the third magnetic leg comprises:

a plurality of discretely disposed sub-legs, a first one of the sub-legs being connected to the third magnetic base, and a second one of the sub-legs being disposed between said first one of the sub-legs and the second magnetic base;

wherein a first air gap is formed between said first one of the sub-legs and said second one of the sub-legs; and wherein a second air gap is formed between said second one of the sub-legs and the second magnetic base.

12. The magnetic assembly according to claim 11, further comprising an air gap forming material filled in the first and second air gaps to secure the sub-legs in place.

13. The magnetic assembly according to claim 1, wherein the magnetic core comprises two magnetic sub-cores, and the winding assembly comprises two winding sub-assemblies.

14. The assembly according to claim 13, wherein, when the magnetic core is magnetized by a reference current in the winding assembly, a magnetic flux in the first magnetic leg of one of the two magnetic sub-cores is induced along a direction opposite to that of a magnetic flux in the first magnetic leg of the other one of the two magnetic sub-cores, and a magnetic flux in the second magnetic leg of one of the two magnetic sub-cores is induced along a direction opposite to that of a magnetic flux in the second magnetic leg of the other one of the two magnetic sub-cores.

15. The magnetic assembly according to claim 13, wherein the second magnetic leg of each of the two magnetic sub-cores comprises a plurality of air gaps.

16. The magnetic assembly according to claim 13, wherein the second magnetic leg of each of the two magnetic sub-cores comprises a plurality of sub-legs connected between the first and second magnetic bases, such that one air gap or more air gaps are formed between the sub-legs.

17. The magnetic assembly according to claim 16, further comprising an air gap forming material filled in the air gaps to secure the sub-legs in place.

18. The magnetic assembly according to claim 17, wherein the air gap forming material is a non-conductive and non-magnetic material.

19. The magnetic assembly according to claim 13, wherein the first magnetic legs of the two magnetic sub-cores are disposed between the two magnetic sub-cores.

20. The magnetic assembly according to claim 13, wherein the two magnetic sub-cores are disposed between the first magnetic legs of the two magnetic sub-cores.

21. The magnetic assembly according to claim 13, wherein the two magnetic sub-cores are adjacent to each other, and the first magnetic legs of the two magnetic sub-cores are adjacent to each other.

22. The magnetic assembly according to claim 1, further comprising a case that encases the magnetic core and the winding assembly, and a thermal glue that fills in a vacant apace of the case in which the magnetic core and the winding assembly are encased.

23. The magnetic assembly according to claim 1, wherein the third winding comprises a copper sheet.

24. The magnetic assembly according to claim 23, wherein the first winding and the second winding are at least partially covered by the third winding.

25. The magnetic assembly according to claim 23, wherein a turn number of the third winding is one.

26. A power converter, comprising:

a first port, a second port, and a third port;

a transformer comprising a magnetic core, a primary winding, a first secondary winding, and a second secondary winding;

a first circuit electrically coupled between the first port and the primary winding;

a second circuit electrically coupled between the second port and the first secondary winding;

a third circuit electrically coupled between the third port and the second secondary winding, wherein the third circuit comprises a secondary inductor electrically coupled with the second secondary winding;

wherein the magnetic core comprises:

a first magnetic leg and a second magnetic leg spatially separated from the first magnetic leg to define a spatial channel therebetween, a winding assembly comprising a first winding, a second winding, and a third winding, the first and second windings being wound around the first magnetic leg with at least a part of the first and second windings being accommodated within the spatial channel, and the third winding being wound around the first and second magnetic legs;

wherein the first winding is disposed between the first magnetic leg and the second winding, and the second winding is disposed between the first winding and the third winding, and the second magnetic leg is only wound with the third winding.

27. The magnetic assembly according to claim 26, wherein the first winding serves as the primary winding, the second winding serves as the first secondary winding, and the third winding serves as the second secondary winding and the second inductor.

28. The magnetic assembly according to claim 26, wherein the first winding serves as the first secondary winding, the second winding serves as the primary winding, and the third winding serves as the second secondary winding and the second inductor.

29. An on board charger, comprising:

a power converter, comprising:

a first port, a second port, and a third port;

a transformer comprising a magnetic core, a primary winding, a first secondary winding, and a second secondary winding;

a first circuit electrically coupled between the first port and the primary winding;

a second circuit electrically coupled between the second port and the first secondary winding;

a third circuit electrically coupled between the third port and the second secondary winding, wherein the third circuit comprises a secondary inductor electrically coupled with the second secondary winding;

wherein the magnetic core comprises:

a first magnetic leg and a second magnetic leg spatially separated from the first magnetic leg to define a spatial channel therebetween, a winding assembly comprising a first winding, a second winding, and a third winding, the first and second windings being wound around the first magnetic leg with at least a part of the first and second windings being accommodated within the spatial channel, and the third winding being wound around the first and second magnetic legs;

wherein the first winding is disposed between the first magnetic leg and the second winding, and the second winding is disposed between the first winding and the third winding, and the second magnetic leg is only wound with the third winding.

* * * * *